US007606808B2

(12) United States Patent
McCann et al.

(10) Patent No.: US 7,606,808 B2
(45) Date of Patent: Oct. 20, 2009

(54) MAINTAINING AND ESTABLISHING SUBSCRIPTIONS WITH LOAD-BALANCED SERVERS

(75) Inventors: Robert E. McCann, Seattle, WA (US); John L. Gibbon, Renton, WA (US); Robert M. Congdon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 284 days.

(21) Appl. No.: 11/467,217

(22) Filed: Aug. 25, 2006

(65) Prior Publication Data

US 2008/0065652 A1 Mar. 13, 2008

(51) Int. Cl.
*G06F 17/30* (2006.01)
*G06F 15/16* (2006.01)
(52) U.S. Cl. .................. 707/10; 707/100; 707/200; 709/203; 709/206
(58) Field of Classification Search .............. 707/104.1, 707/10, 200; 709/200, 203, 206; 370/401, 370/392
See application file for complete search history.

(56) References Cited

U.S. PATENT DOCUMENTS

| | | | |
|---|---|---|---|
| 6,286,104 B1 | 9/2001 | Buhle et al. | |
| 6,393,458 B1* | 5/2002 | Gigliotti et al. | 709/203 |
| 6,510,513 B1* | 1/2003 | Danieli | 713/156 |
| 6,714,962 B1 | 3/2004 | Helland et al. | |
| 6,922,724 B1 | 7/2005 | Freeman et al. | |
| 7,133,846 B1* | 11/2006 | Ginter et al. | 705/54 |
| 2001/0052024 A1 | 12/2001 | Devarakonda et al. | |
| 2003/0149737 A1* | 8/2003 | Lambert et al. | 709/214 |
| 2004/0001498 A1* | 1/2004 | Chen et al. | 370/401 |
| 2004/0003099 A1 | 1/2004 | House et al. | |
| 2004/0205250 A1 | 10/2004 | Bain et al. | |
| 2004/0250248 A1 | 12/2004 | Halpern et al. | |
| 2005/0021622 A1* | 1/2005 | Cullen | 709/204 |
| 2005/0210109 A1 | 9/2005 | Brown et al. | |
| 2006/0041503 A1* | 2/2006 | Blair et al. | 705/37 |
| 2006/0047742 A1* | 3/2006 | O'Neill et al. | 709/203 |
| 2006/0149811 A1* | 7/2006 | Bennett et al. | 709/203 |

FOREIGN PATENT DOCUMENTS

WO WO 2007068268 A1 * 6/2007

OTHER PUBLICATIONS

Gero Muhl, Michael A. Jaeger, Klaus Herrmann, Torben Weis, Andreas Ulbrich, and Ludger Fiege; "Self-stabilizing Publish/Subscribe Systems: Algorithms and Evaluation", Aug. 2, 2005.*

(Continued)

*Primary Examiner*—Tony Mahmoudi
*Assistant Examiner*—Dennis Truong
(74) *Attorney, Agent, or Firm*—Senniger Powers

(57) ABSTRACT

A notification subscription application allows a subscriber to maintain event notification continuity in a load-balanced work environment. The notification subscription application proactively provides the subscriber notifications indicating an operating status of the subscription. In this manner, subscribers can reduce the number of missed event notifications, by readily reestablishing a subscription when required. The notification service associates markers with events such that event notifications occurring during a period of time when the notification subscription is not operating properly can be identified when the subscription is reestablished.

17 Claims, 4 Drawing Sheets

OTHER PUBLICATIONS

Cabrera et al., "Herald: Achieving a Global Event Notification Service," Eighth Workshop on Hot Topics in Operating Systems, pp. 87-92, Proceedings of the Eighth Workshop on May 20-22, 2001, USA, http://csdl2.computer.org/persagen/DLAbsToc.jsp?resourcePath=/dl/proceedings/&toc=comp/proceedings/ hotos/2001/1040/00/1040toc.xml&DOI=10.1109/HOTOS.2001.990066.

Chen et al., "Scan: A Dynamic, Scalable, and Efficient Content Distribution Network," Lecture Notes in Computer Science, 2002, p. 282, vol. 2414/2002, Springer Berlin / Heidelberg, Germany, http://www.springerlink.com/content/wmxcyyp86urbmpx/?p=b3926d46da1e4a9da54098b5cb4f0efc&pi=0.

Greenlee et al., "Serving Database Information Using a Flexible Server in a Three Tier Architecture," Talk from the 2003 Computing in High Energy and Nuclear Physics (CHEP03), pp. 1-4, Mar. 2003, La Jolla, Ca USA, http://arxiv.org/abs/cs/0307001.

\* cited by examiner

MAINTAINING AND ESTABLISHING SUBSCRIPTIONS WITH LOAD-BALANCED SERVERS

BACKGROUND

Maintaining up-to-date information in a wide variety of areas is very important to many people. These people often desire to be alerted to time-sensitive events and information. Content providers generate content for notifications, which are then delivered to one or more subscriber electronically (e.g., via electronic mail). For example, a news organization may provide notification content relating stock prices, breaking news, weather conditions, traffic conditions, etc. A subscriber's expressed interest to receive electronic notifications for a particular class of content is generally called a notification subscription. Such subscriptions often are made between the end subscriber and the content provider that sends the notifications. Event-driven notifications of this type are often referred to as alerts or event notifications.

A notification service typically consists of a client tier or front-end server that provides a subscriber interface to a subscriber, and a middle tier that includes a plurality of load balanced back-end servers that can access a data tier to identify relevant events for a particular subscription. Disadvantageously, due to the three-tiered architecture in conventional notifications networks, the client tier requires contiguous notification of events that occur on the data tier but is only able to communicate with the server tier. However, because the server tier consists of a plurality of servers in which a balancing component is implemented to distribute the load experienced by each of the plurality of servers, the client tier is incapable of maintaining affinity to any single server in the array when the connection is disrupted. As a result, when a disruption in service occurs the client tier is not guaranteed reconnection to the same back-end server, and the client tier has to establish a new subscription. Unfortunately, the new subscription will likely be hosted by a different one of the array of servers and, thus, the subscriber can miss notification of events occurring during the disruption in the notification service.

SUMMARY

Aspects of the invention overcome one or more deficiencies in known notification services by proactively providing the status of a notification subscription to the subscriber. For example, according to one aspect of the invention the subscriber receives notifications indicating whether a lack of notifications is due simply to a lack of event occurrence or if the subscription should be reestablished because the subscription is not operating properly. In this manner, subscribers can reduce the number of missed event notifications, by readily reestablishing a subscription when required. Other aspects of the invention involve associating markers or watermarks with events such that event notifications that occur during a period of time when the notification subscription is not operating properly can later be identified when the subscription is reestablished.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
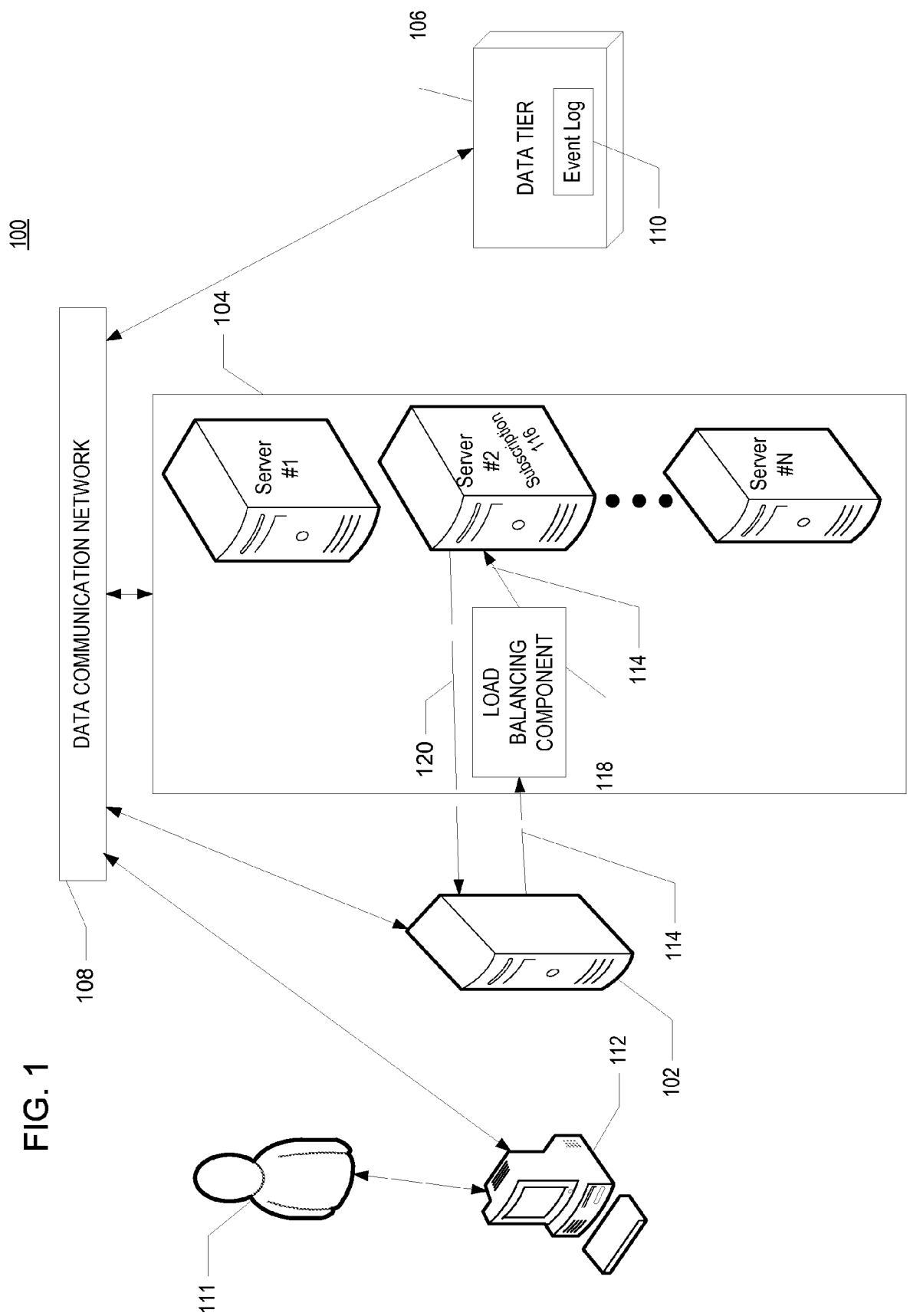
FIG. 1 is an exemplary embodiment of a suitable notification service environment in which the invention may be implemented.

Referring first to FIG. 1, an exemplary block diagram illustrates one example of a suitable notification service environment 100 in which the invention may be implemented. In this instance, FIG. 1 diagrammatically shows cross network communication in a notification service environment comprising a client tier 102, a server tier 104, and a data tier 106. The server tier 104 includes one or more back-end servers such as server #1 through server #N and is coupled to the client tier 102 and the data tier 106 via a communication network 108 such as the Internet. The data tier 106 maintains an event log 110 that is a chronologically sequenced table of event data that can be queried by the server tier 104. The client tier 102 is, for example, a front-end server that receives notification of relevant events maintained in the event log 110 from the server tier 104. The client tier 102 provides notification of relevant events to a particular subscriber 111 via a subscriber device 112 such a cell phone, personal data assistant (PDA), computer, or any other communication device. Notably, although the client tier 102 is described herein as a front-end server, it is contemplated that the functions of the client tier 102 can be performed via a general purpose client computer connected to the server tier 104.

The computer 112 typically has at least some form of computer readable media. Computer readable media, which include both volatile and nonvolatile media, removable and non-removable media, may be any available medium that may be accessed by computer 112. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 112. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

Aspects of the present invention provide a hosted notification service for greater versatility and usability. In general, a notification system 100 operating in accordance with embodiments of the invention sends a message, often referred to as an event notification or alert, to a subscribing subscriber via his or her specified subscriber device 112. The message contains event-driven information from a content provider relevant to a topic of interest to which the subscriber 111 has signed up. In other words, a subscriber 111 is a subscriber or other entity that expresses an interest in a topic and receives notifications related to the topic from the content provider. In one embodiment, the combination of a subscriber and a topic constitutes a subscription. Exemplary topics for alerts include email, news, weather, sports, finance, traffic, hobbies, bargains, and so forth. The notifications are usually driven by events such as breaking news, changes in weather or traffic conditions, auction outbid notices, arrival of email, etc. Notably, the notification service environment 100 illustrated in FIG. 1 transcends any one particular transport medium for delivery of notifications. That is, the invention may use any of a plurality of transport mediums such as electronic mail, instant messaging, mobile short-message-service messaging, wireless communications, etc.

Notification-based applications may also be referred to as publisher/subscriber services. In this instance, a subscriber 111 using a particular subscriber device such as a computer 112 interacts with the client tier 102 via a user interface to request the creation of subscriptions for the topics of interest to them. Thereafter, the client tier 102 submits a subscription request, as indicated by arrow 114, to the server tier 104 to create a subscription 116 on one of the back-end servers (e.g., server #1 through server #N). A load balancing component 118, associated with the server tier 104 receives the subscription request 114, and designates one of the server #1-server #N to host the subscription 116. As known to those skilled in the art, load balance components can be implemented to distribute the load experienced by an array of servers. Thereafter, the subscription 116 queries the event log 110 to match events that correspond to the subscription 116. The server hosting the subscription 116 sends the appropriate event notifications, as indicated by arrow 120, to the client tier 102 for matching events. In general, a subscription 116 has components for the following: subscription store (and corresponding application programming interfaces (APIs)); external "event" feed (and corresponding APIs); notification generation by matching external events with the corresponding stored subscriptions; and delivery/routing of notifications; subscription management application.

In notification networks having a three-tiered architecture such as illustrated in FIG. 1, the client tier 102 requires contiguous notification of events that occur on the data tier 106 but is only able to communicate with the server tier 104. However, because the server tier 104 consists of an array of servers (e.g., servers #1 to servers #N) in which a balancing component 118 is implemented, the client tier 102 is incapable of maintaining affinity to any single server in the array when the connection is disrupted. As a result, when a disruption in service occurs, the client tier 102 is not guaranteed reconnection with the same back-end server, and the client tier 102 will have to establish a new subscription. Unfortunately, the new subscription will likely be hosted by a different one of the array of servers and can, thus, the subscriber 111 can miss notification of events that occur during the disruption in the notification service.

According to one embodiment of the present invention, the subscription request 114 includes expiration data that corresponds to a maximum period of time after which to verify that the subscription is operating properly. If no events are detected for the period of time defined by the expiration data, the server (e.g., server #2) hosting the subscription determines whether the lack of events are due to inactivity or due to a communication connection error, and the server then notifies the subscriber 111 of its determination via the client tier 102. This allows the subscriber 111 to receive notification regarding whether the lack of event notifications 120 is due simply to a lack of event occurrence or if the subscription needs to be reestablished because the subscription 116 is not operating properly (e.g., communication link between server tier and data tier is severed). As a result, the subscriber 111 can reduce the number of missed event notifications, by readily reestablishing the subscription. Moreover, as described in more detail in reference to FIG. 3 below, the subscription creates and associates markers or watermarks with events in the event log 110. Thereafter, the subscription utilizes watermarks to insure that the subscriber 111 receives notification of all events—including those that occurred during a period of time when the subscription was interrupted.

Figure 2:
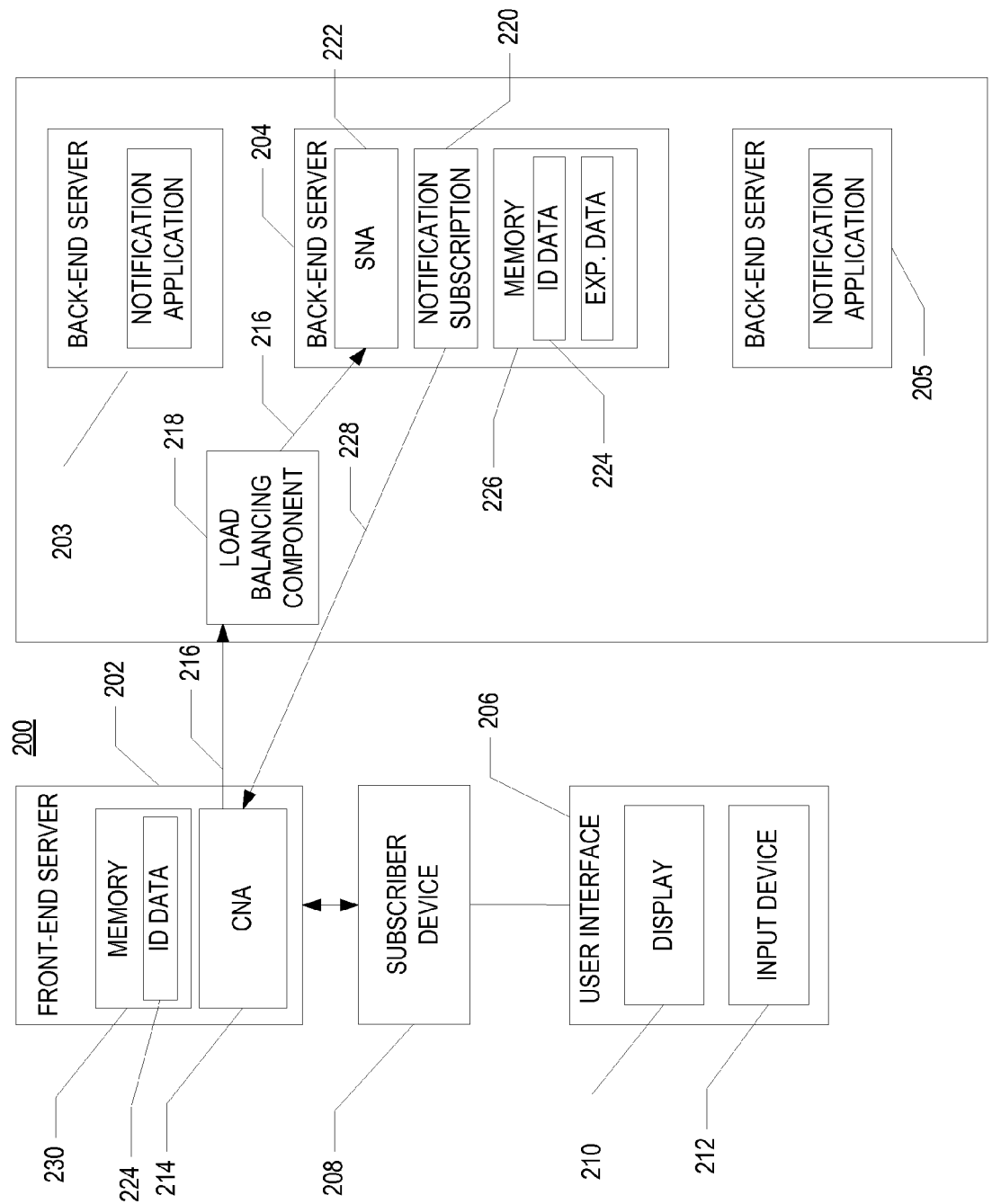
FIG. 2 is an exemplary block diagram illustrating a system for establishing a notification subscription in a notification network according to one embodiment of the invention.

Referring now to FIG. 2, a block diagram illustrates a system 200 for establishing a subscription in a notification network 200 comprising a front-end server 202 (e.g., a client tier 102) and an array of load balanced back-end servers 203, 204, 205 (e.g., server tier 104) according to one embodiment of the invention. A user-interface (UI) 206 linked to a subscriber device 208 (e.g., subscriber device 112) allows a subscriber or user (e.g., subscriber 111) to interact with an input form (not shown) provided by the front-end server 202 to request the creation of a notification subscription. For example, the UI 206 may include a display 210 such as a computer monitor for viewing data and/or input forms, and an input device 212 such as a keyboard or a pointing device (e.g., a mouse, trackball, pen, or touch pad) that allows the subscriber to interact with the input form to define events of interest data. Thereafter, the subscriber uses the UI 206 to submit the defined events of interest data to the front-end server 202.

A client notification application (CNA) 214 executed on the front-end server 202 is responsive to the input data received from the subscriber device 208 via the input form to generate a subscription request 216 that includes the user defined events of interest. The front-end server 202 provides the subscription request 216 to a load balancing component 218 associated with the array of back-end server 203, 204, 205 to create a notification subscription 220 based on the defined events of interest included in the subscription request 216. The load balancing component 218 directs the subscription request 216 to a particular one of the back-end servers 203, 204, 205 (e.g., back end server 204) to host the notification subscription 220. The subscription request 216 also includes address data, such as a uniform resource locator (URL), for the front-end server 202 from which the subscription request 216 is received. The designated server 204 is responsive to the subscription request 216 to execute a server notification application (SNA) 222 that creates the notification subscription 220. The SNA 222 associates the address data and any other data included in the subscription request 216 with the created notification subscription 220. After creating the notification subscription 220, the SNA 222 defines unique identification data 224 that is stored in a memory 226 of the designated server 204. The SNA 222 then sends a subscription response 228 to the front-end server 202 at the address specified by the address data. The subscription response 228 includes the unique identification data 224 that corresponds to the notification subscription 220. The front-end server 202 is responsive to the subscription response 228 to store the unique identification data 224 in a memory 230 of front-end server 202.

Figure 3:
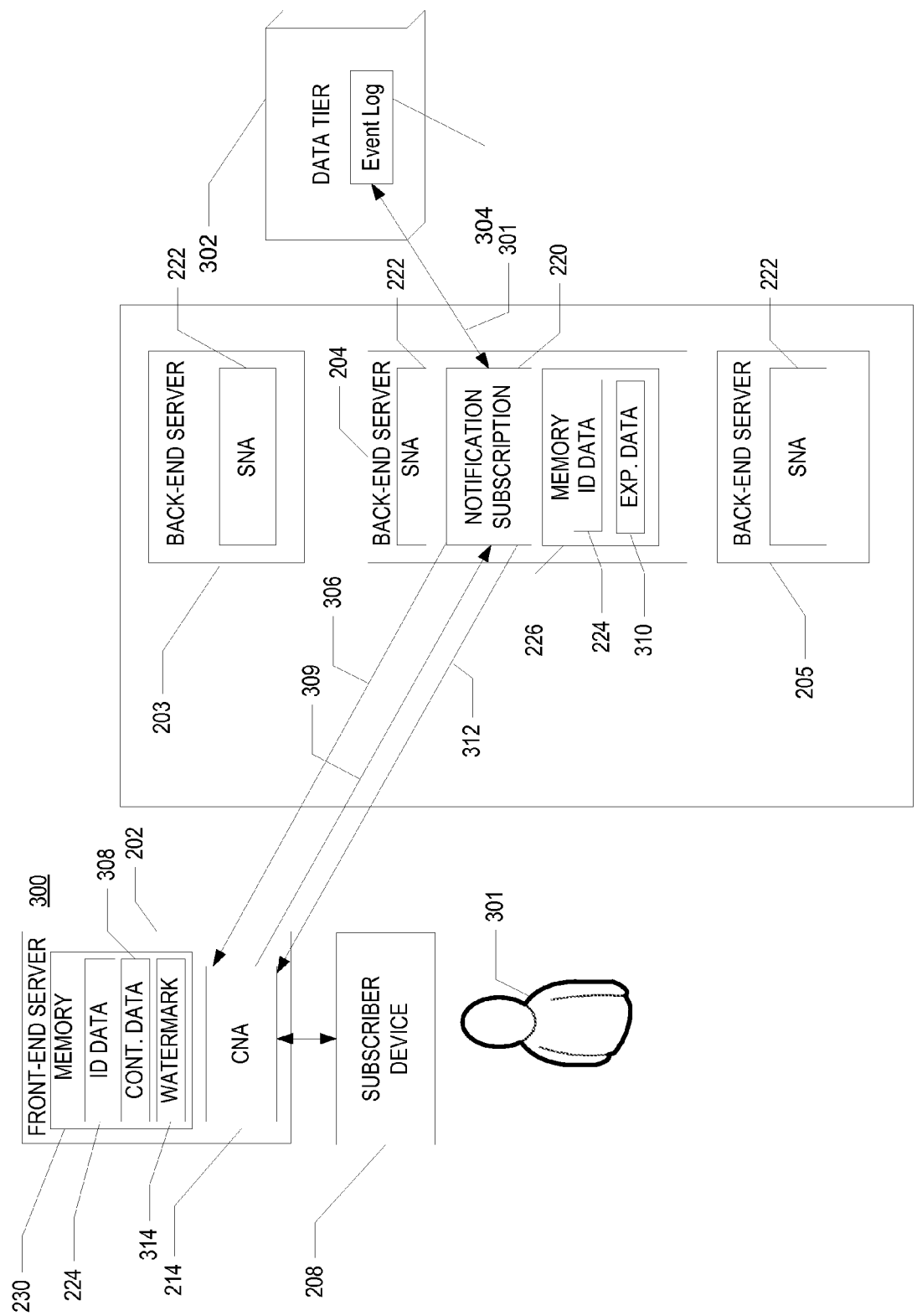
FIG. 3 is an exemplary block diagram illustrating a system for providing event notifications to a subscriber of a notification subscription according to one embodiment of the invention.

Referring now to FIG. 3, a block diagram illustrates a system 300 for providing event notifications to a subscriber 301 (e.g., subscriber 111) of a notification subscription 220 via a notification network 200 such as described in FIG. 2. The created notification subscription 220 queries, as indicated by reference character 301, a data tier 302 (e.g., data tier 106) that maintains an event log 304 comprised of chronological event data related to one or more subscriptions to identify relevant event data. If the event log 304 contains event data that corresponds to the notification subscription 220 (i.e., relevant event data), the notification subscription 220 sends a notification request 306 to the front-end server 202. The notification request 306 includes the created unique identification data 224 and the relevant event data. The CNA 214 authenticates the notification request 306 by comparing the unique identification data 224 included in the notification request 306 with unique identification data 224 stored in the memory 230. This allows the CNA 214 to verify that the notification request 306 is associated with a notification subscription 220 created in response to a previous subscription request 216 that initiated from this particular front-end server 202. If the front-end server 202 determines the notification request 306 is associated with a valid notification subscription 220, the relevant event data included in the notification request 306 is stored in the memory 230 of the front-end server 202.

According to another aspect of the invention, the CNA 214 is responsive to unique identification data 224 included in the received notification request 306 to retrieve corresponding continuity data 308 from the memory 230 of the front-end server 202. The CNA 214 then determines if the subscriber 301 desires to retain the notification subscription 220 or to cancel the notification subscription 220. Continuity data 308 can be defined by a subscriber 301 to specify date and/or time in the future to cancel the subscription 220, or to specify "yes" and "no" values indicating whether or not the subscription 220 is cancelled. For example, the UI 206 linked to the subscriber device 208 allows the subscriber 301 to interact with an input form (not shown) that has been downloaded or retrieved from the front-end server 202 to define continuity data 308 for a particular notification subscription 220. Alternatively, the continuity data 308 may specify a default period of time after which the subscription 220 should be cancelled. The CNA 214 sends a notification response 309 to the back-end server 204 that includes instructions to retain the subscription or to cancel the subscription 220 based on the continuity data 308.

Notably, although the continuity data 308 is described above as being defined by a subscriber 301, the back-end server can change continuity data 308 without any subscriber 301 knowledge or intervention. For example, according to one aspect of the invention, if the front-end server 202 does not receive a notification of an event from the back-end server 204 over the period of time specified by the expiration parameter, and the front-end server 202 determines the subscription is non functional (e.g., communication link error), as described in more detail below in reference to FIG. 4, the front-end server 202 reestablishes the subscription with another subscription request. Thereafter, a notification request 306 may come from the back-end server 204 to the front-end server 202 for the original subscription 220. However, since the front-end server 202 essentially replaces the original subscription 220 with a new subscription (e.g., see new notification subscription 406 in FIG. 4), the response to the request will be for the original subscription 220 to be cancelled.

According to another aspect the invention, the subscription request 216 can include expiration parameter data that corresponds to a maximum period of time after which the subscriber would like to verify that the subscription is functioning properly. Similar to continuity data, expiration parameter data can be defined by a subscriber using the UI 206 linked to the subscriber device 208 to interact with an input form to define an expiration parameter value (e.g., 2 hours). The SNA 222 stores expiration parameter data 310 included in the subscription request 216 in the memory 226 of the server 204. In operation, the server 204 communicates with the data tier 302 at a predefined/non client configurable interval. For example, the SNA 222 queries the data tier 302 every two seconds looking for events. Thereafter, if the notification subscription 220 fails to identify any events for a period time greater than the maximum period of time specified by the expiration parameter data 310, the SNA 222 determines if the lack of events is due to a break in the communication link established between the server 204 and data tier or simply a lack of events. If the communication link between the server 204 and data tier 302 is still established (e.g., can query data tier 302) and no events have been found in the data tier 302 for the configured timeframe as specified by the expiration parameter data 310, a different notification request 312 is sent from the notification subscription 220 to the CNA 314 to notify the subscriber 301 of the inactivity. On the other hand, if it is determined that the communication link has been interrupted (e.g., cannot query data tier 302), the different notification request 312 sent from the notification subscription 220 to the CNA 314 notifies the subscriber 301 that service has been interrupted.

According to yet another aspect of the invention, the notification subscription 220 generates a current watermark for every notification request 306 sent from the back-end server 204 to the front-end server 202. Watermarks are, for example, string values that can be translated to specific points in the event log by the back-end server 204. That is, the watermarks themselves do not include relevant event data internally. According to one aspect of the invention, watermarks are row numbers in a database (e.g., event log) that are each specific to a particular event in the event table. As a result, the same watermark can be provided to multiple subscriptions that each have interest in the same particular event. For example, if a new email message event were in the event table with watermark "abc123", that event and watermark might be distributed to two different subscriptions that were looking for new email on that particular users mailbox. In this embodiment, if the front-end server determines that the notification request 306 is associated with a valid notification subscription 218, the relevant event data and the current watermark 314 included in the notification request 306 are stored in the memory 230 of the front-end server 204.

Moreover, every notification request 306 sent from the back-end server 204 to the front-end server 202 also includes a previous watermark. Thus, in addition to unique identification data and relevant event data, each notification request 306 includes a current watermark and a previous watermark. The previous watermark corresponds to a last notification request that was successfully sent to the front-end server 202 by the notification subscription 220. The CNA 214 confirms receipt of the last event notification associated with the notification subscription 220 by comparing the previous watermark included in the notification request 306 to watermarks 314 stored in memory 230 to verify that they are matching watermark values.

Figure 4:
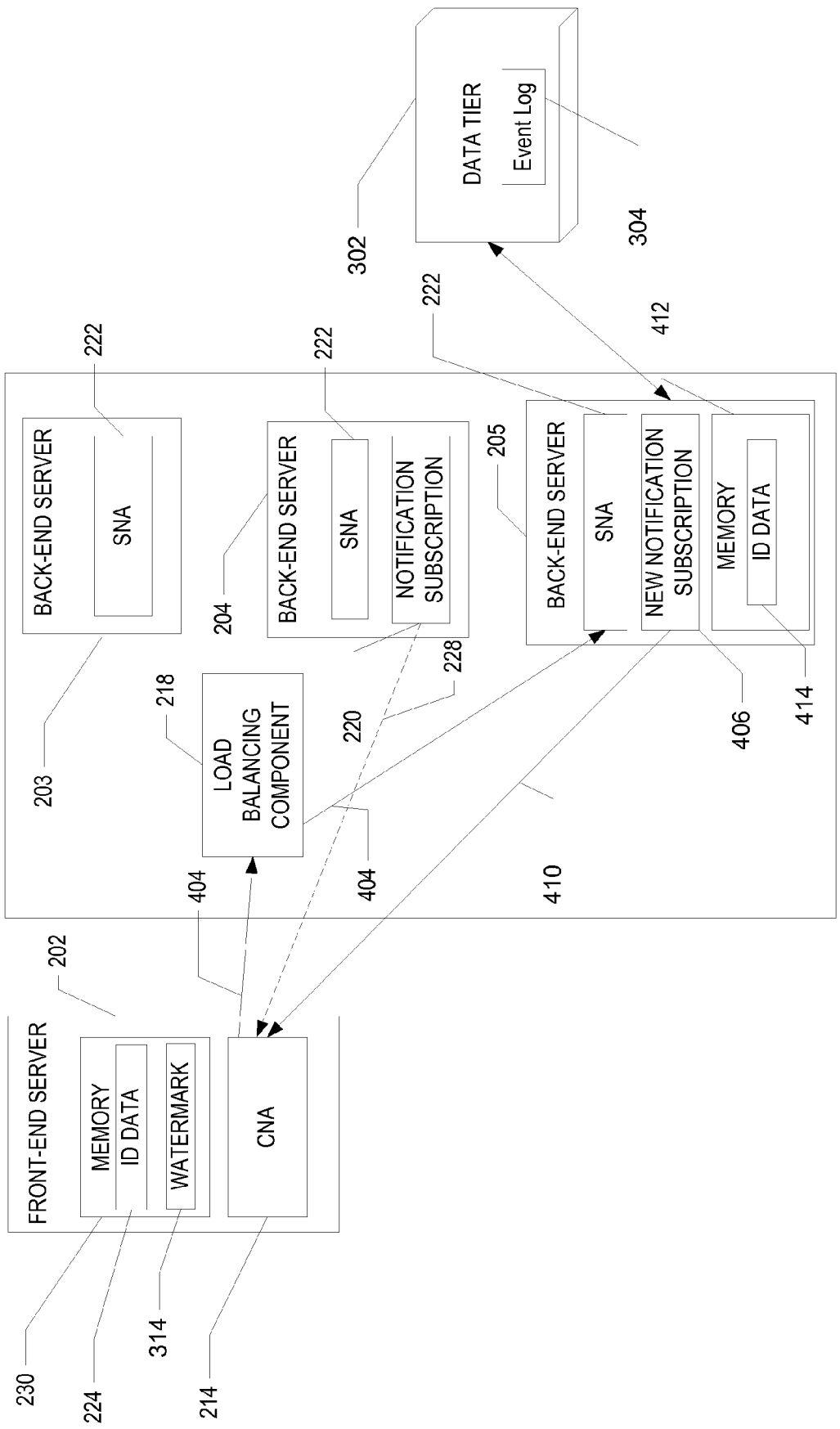
FIG. 4 is an exemplary block diagram illustrating a system for reestablishing an interrupted subscription in a notification network according to one embodiment of the invention.

Referring now to FIG. 4, a block diagram illustrates a system 400 for reestablishing an interrupted notification subscription in a notification network 200 such as described in FIG. 2. The notification subscription 220 being hosted on a back-end server 204 may, for any number of reasons, stop functioning properly and/or lose the ability to communicate notification requests (e.g., notification request 306) to the front-end server 202. In such circumstances, the front-end server 202 needs to be able to establish a new notification subscription 406, and yet maintain a contiguous set of events of interest. For example, when the CNA 214 determines an event notification 228 was lost (as shown in phantom) because a previous watermark included in a notification request does not match watermark data 314 stored in memory 230, it is important that the front-end server 202 have the ability to create the new notification subscription 406 and maintain a contiguous stream of events.

According to an aspect of the invention, the CNA 214 is responsive to a determined lost event, to generate a new subscription request 404 that includes the previous watermark. The load balancing component 218 receives the new subscription request 404 and may redirect the subscription request 404 to a different one of the back-end servers 203, 204, 205 (e.g., back end server 205) to host a new notification subscription 406. The newly designated server 205 is responsive to the subscription request 404 to execute a SNA 222 to create the new notification subscription 406. The new subscription is established from the watermark "forward." In other words, because watermarks can be translated into specific points in an event log 304 by the new notification subscription, the previous watermark included in the new subscription request 404 is translated to a specific point in the event log 304 to insure that any events in the event log that correspond to events after that specific point are captured by the new notification subscription 406.

After creating the new notification subscription 406, the SNA 222 defines unique identification data 414 that is stored in a memory 412 of the newly designated server 205. The SNA 222 sends a subscription response 410 to the front-end server 202 at the associated address. The subscription response 410 includes the new unique identification data 414 that corresponds to the new notification subscription 406. The front-end server 202 is responsive to the subscription response 410 to store the new unique identification data 414 in memory 412 of the server 205. Thereafter, the created notification subscription 220 queries the data tier 302 maintaining the event log 304 as described above in connection to FIG. 3 to identify relevant event data.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 112 embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comrpising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computer implemented method for providing event notifications for notification subscriptions from a plurality of load-balanced servers in a server tier to a client tier in a communications network, said method comprising:

receiving, at the server tier, a first subscription request from a subscriber via the client tier, said subscription request defining an event of interest and an address in the client tier of the subscriber, said first subscription request including an expiration parameter from the client tier specifying a defined period of time after which to verify that the subscription is working properly, said subscription request being generated in response to input data received from the subscriber;

creating, by a particular server of the server tier, a first notification subscription corresponding to the received first subscription request, wherein the particular server is designated to host the created first notification subscription;

periodically querying a data tier maintaining an event log, and being queried by the particular server to identify relevant event data based on the first notification subscription;

sending a notification request from the particular server of the server tier to the client tier to notify the client tier of the identified relevant event data;

receiving, at the server tier, a second subscription request automatically generated at the subscriber via the client tier, the second subscription request defining the event of interest and the address in the client tier of the subscriber if the client tier does not receive the notification request from the particular server for a period of time specified by the expiration parameter;

wherein the server tier receives the second subscription request and creates a second notification subscription corresponding to the received second subscription request independent of the particular server of the server tier, wherein the second subscription request includes an expiration parameter defined by a subscriber, said expiration parameter specifying a period of time after which the client tier is to be notified of the failure of the server tier to identify relevant event data; and wherein the subscriber via the client tier automatically sends a cancellation request for the first notification subscription in response to receiving a subsequent notification request associated with the first notification subscription.

2. The method of claim 1 further comprising sending a subscription response from the particular server in the server tier to the client tier in response to the created notification subscription(s), wherein said subscription response includes unique identification data corresponding to the created notification subscription(s), and wherein said unique identification data is stored on the client tier.

3. The method of claim 2, wherein the notification request includes the unique identification data and the identified relevant event data, and wherein the client tier authenticates the notification request by comparing the unique identification data included in the notification request with the unique identification data stored on the client tier.

4. The method of claim 1 further includes receiving, at the server tier, a notification response from the client tier, said notification response being generated by the client tier in response to the notification request and said notification response providing instructions to the server tier to retain the subscription or to cancel the subscription based on subscription continuity data stored on the client tier.

5. The method of claim 4, wherein the subscription continuity data stored on the client tier is defined by the subscriber of the client tier.

6. The method of claim 1 further including: creating, at the particular server of the server tier, a current watermark that corresponds to the identified relevant event data, and wherein the notification request sent to the client tier further includes the current watermark; and storing, on the client tier, the current watermark included in the notification request.

7. The method of claim 6, wherein the notification request further includes a previous watermark that corresponds to different identified relevant event data included in a previous notification request sent to the client tier, and wherein the client tier compares the included previous watermark to stored watermarks to confirm receipt of the previous notification request.

8. The method of claim 7 further including: receiving, at the server tier, a new subscription request from the client tier in response to the failure to match the previous watermark included in the notification request with the watermarks stored on the client tier, said new subscription request defining relevant event data corresponding to the previous watermark; and creating a new notification subscription in response to the received new subscription request.

9. A system for sending event notifications for notification subscriptions from a server tier to a client tier in a communications network, said system including a front-end server for performing the functions of said client tier, said system including a plurality of back-end servers for performing the functions of said server tier, said system comprising:

a client tier for generating a first subscription request, said subscription request defining an event of interest and an address in the client tier of a subscriber, wherein the first subscription request includes an expiration parameter defined by a subscriber, said expiration parameter specifying a period of time after which the client tier is to be notified of the failure of the server tier to identify relevant event data;

a server tier linked to the client tier for receiving the first subscription request and creating a first notification subscription on a first back-end server corresponding to the received first subscription request, said first back-end server being one of the plurality back-end servers, wherein the first back-end server is designated to host the notification subscription;

a data tier for maintaining an event log maintained and being queried by the first back-end server to identify relevant event data based on the first notification subscription;

wherein the first back-end server sends a notification request associated with the first subscription to the client tier to notify the client tier of the identified relevant event data;

wherein the front end server automatically generates a second subscription request defining the event of interest and the address in the client tier of the subscriber if the client tier does not receive a notification request from the first back-end server for a period of time specified by the expiration parameter;

wherein the server tier receives the second subscription request and creates a second notification subscription corresponding to the received second subscription request independent of the first back-end server of the server tier, wherein the second subscription request includes an expiration parameter defined by a subscriber, said expiration parameter specifying a period of time after which the client tier is to be notified of the failure of the server tier to identify relevant event data; and wherein the front end server automatically sends a cancellation request for the first notification subscription in response to receiving a subsequent notification request associated with the first notification subscription.

10. The system of claim 9, wherein the server tier further sends a subscription response from the server tier to the client tier in response to the created first notification subscription, wherein said subscription response includes unique identification data corresponding to the created first notification subscription, and wherein the client tier is responsive to the subscription response to store the included unique identification data in a memory.

11. The system of claim 10, wherein the notification request includes the unique identification data and the relevant event data, and wherein the client tier authenticates the notification request by comparing the unique identification data included in the notification request with the unique identification data stored in the memory.

12. The system of claim 9, wherein the client tier sends a notification response to the server tier in response to the first notification request, said notification response providing instructions to the server tier to retain the subscription or to cancel the subscription based on subscription continuity data stored on the client tier.

13. The system of claim 12, wherein the subscription continuity data stored on the client tier is defined by the subscriber of the client tier.

14. The system of claim 9, wherein the server tier sends a different notification request to notify the client tier of the failure to identify one or more relevant events after the expiration of the specified period of time.

15. The system of claim 9, wherein the particular server of the server tier further creates a current watermark that corresponds to the identified relevant event data, and wherein the notification request sent to the client tier by the server includes the current watermark, and wherein the client tier stores the current watermark included in the notification request in a memory.

16. The system of claim 15, wherein the notification request further includes a previous watermark that corresponds to identified relevant event data included in a previous notification request sent to the client tier, and wherein the client tier compares the included previous watermark to watermarks stored in the memory of the client tier to confirm receipt of the previous notification requests.

17. The system of claim 16, wherein the client tier further creates a new subscription request when the previous watermark included in the notification request does not match any watermarks stored in the memory, said new subscription request defining for relevant event data corresponding to the previous watermark, and wherein the server tier creates a new notification subscription in response to receiving the new subscription request from the client tier.

* * * * *